(No Model.)
H. TINDELL.
AUTOMATIC WEIGHING DEVICE FOR CARDING MACHINES.
No. 457,570. Patented Aug. 11, 1891.
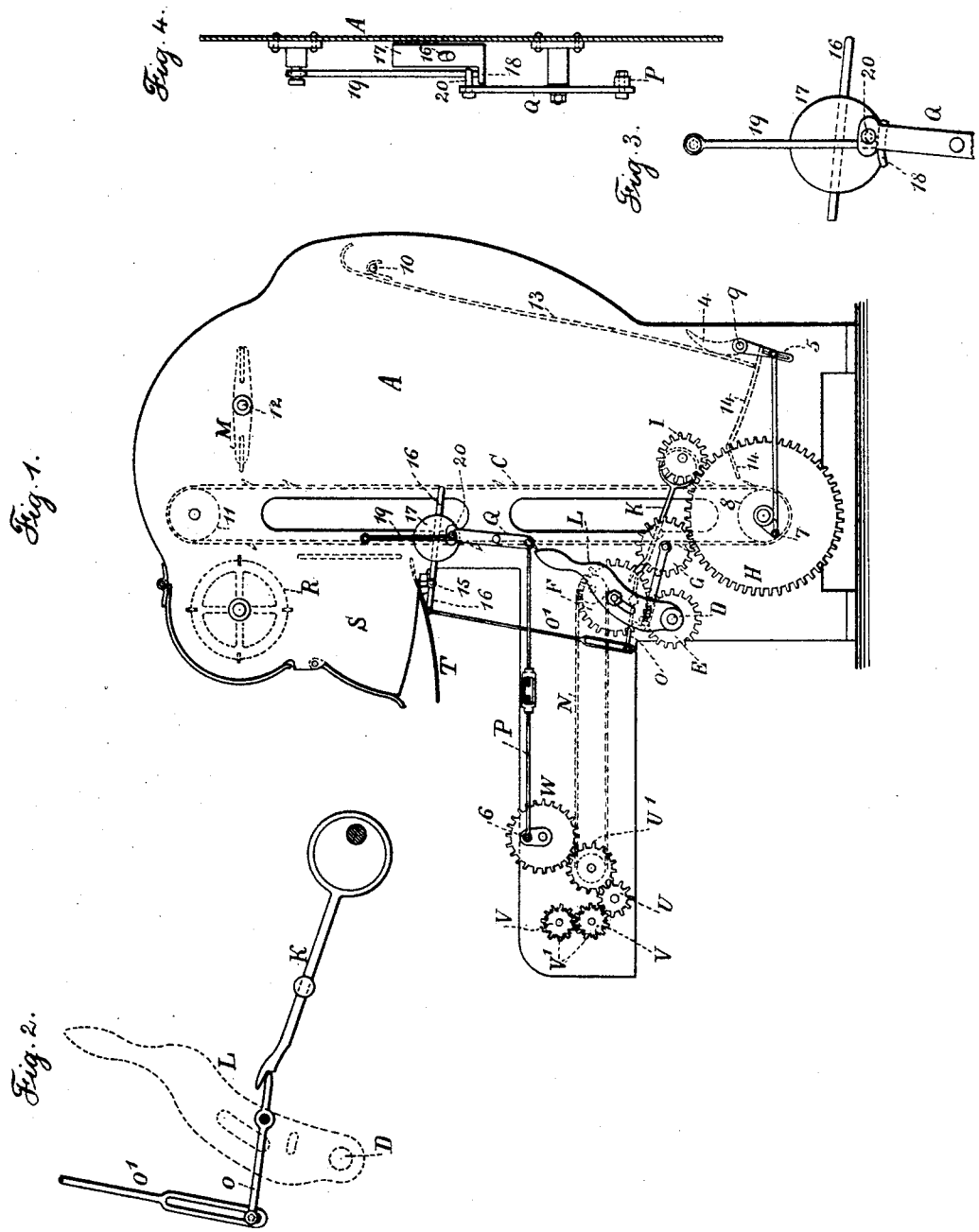

UNITED STATES PATENT OFFICE.

HENRY TINDELL, OF HARRISON, NEW JERSEY.

AUTOMATIC WEIGHING DEVICE FOR CARDING-MACHINES.

SPECIFICATION forming part of Letters Patent No. 457,570, dated August 11, 1891.

Application filed April 27, 1891. Serial No. 390,579. (No model.)

*To all whom it may concern:*

Be it known that I, HENRY TINDELL, a citizen of the United States, residing at Harrison, in the county of Hudson and State of New Jersey, have invented an Improvement in Automatic Weighing Devices for Carding-Machines, of which the following is a specification.

In carding-machines it is customary to supply upon the feed-apron a certain weight of wool or other fiber for a given length of apron, in order that the roving produced by such carding-machine may be uniform.

In Letters Patent No. 439,311, granted to me October 28, 1890, an automatic feeding and weighing mechanism is represented in which the wool is elevated by a vertical belt with teeth, and it is delivered into a hopper with a pivoted bottom that yields to discharge the contents when such hopper contains a given weight of fiber. In my present invention I combine with the automatic feeding and weighing mechanism of the general character described in my said patent an automatic connection to the feed of a carding-machine, whereby the weighing mechanism is made to arrest the movement of the feeding mechanism when the proper weight of fiber has been delivered into the weighing-hopper and the connection to the carding-machine is made use of in tripping the weighing mechanism to discharge the contents of the hopper periodically, and when this takes place the feeding-belt is again put in motion to supply the fiber into the weighing-hopper.

In the drawings, Figure 1 is a general side elevation of the feeding and weighing mechanism and of the connections to the belt or feed-rolls of the carding-machine, and Fig. 2 is a detached diagram of the disconnecting mechanism. Fig. 3 is an elevation in larger size of the weight and pendent stop, and Fig. 4 is an elevation at right angles to Fig. 3.

The side frames A inclose between them a hopper, into which the wool or other fiber is supplied *en masse*, and there is also an elevating-apron C, passing around the lower roll 8 and the upper roll 11, as in my aforesaid patent, and there is a suitable beater M upon a shaft 12 to keep back the surplus fiber from the teeth of the belt, and there is a rotary doffer R, that removes the fiber from the elevating-belt and deposits the same in the receiver S, the bottom T of which is pivoted at 15 and provided with a weight 17 upon a lever-arm 16, and the fiber as delivered from the weighted bottom T falls upon a belt N, which conveys the same to the feed-rolls V of a carding or similar machine; and a reference is hereby made to the aforesaid patent for a more full description of the construction and operation of the before-mentioned parts; and it is to be understood that this present invention can be used with machines of this general class in which the fiber is opened or picked and delivered to a receiver and discharged therefrom when the proper weight of fiber has accumulated.

I prefer to make use of lever-arms 16 and weights 17 at both sides of the machine, such levers and weights being connected with the respective pivots 15, so that one of these weights may be adjusted for varying the quantity of fiber that is weighed in the receiver, and the other weight 17 or any similar device upon the lever 16 is employed with the automatic stopping and starting mechanism.

The driving-shaft D is provided with a gear-wheel E, and there are two gears F and G between the wheel E and the gear-wheel H— that is, upon the shaft of the lower roller 8 of the elevating-apron C. The gear G remains in contact with the wheel H; but the gear F is moved into and out of contact with the wheel G to stop or to actuate the wheel H and elevating-apron, and there is a gear I, that is driven by the wheel H and is provided with an eccentric or crank pin that gives motion to the pusher K, that slides through a suitable support on the frame, and there is a rocker L, which has the driving-shaft D as its pivot, and such rocker carries the gear-wheel F, and the direction of rotation is such that the wheel E, acting upon the wheel F, tends to swing the rocker L and keep the teeth of the wheel F in gear with the wheel G, and upon the rocker L a pawl O is pivoted, having a slotted link O' extending to one end of the lever 16. Hence when the weighted bottom T of the weighing device drops partially and into the position indicated in Fig. 1, one end of the pawl O is lowered. As the pawl swings upon its pivot on the rocker L, the other end of such pawl rises and comes into the path of the pusher K, so that this pusher K forces back the rocker L and gear-wheel F until the teeth of the latter separate from the wheel G and the wheels G H I all stop and the elevating-apron C ceases to operate. This movement takes place, as hereinafter described, when sufficient fiber has been supplied into the receiver S to overcome the weights 17 and cause the partial downward movement of the bottom T of the receiver.

The feed-rolls V of the carding-machine are connected by the gears V' and by gears U U' to the gear-wheel W, upon which is a crank-pin 6, and adjustable connecting-rod P to the vibrator Q, and the gearing is to be so proportioned that this wheel W revolves at the proper proportionate speed to the feed-rolls V V and apron N, that receives its movement from the shaft of the gear-wheel U'. Hence by proportioning these gears the contents of the receiver S can be dropped with regularity to supply a given weight of fiber each time the apron travels the desired distance. The connecting-rod P is shown of two parts with screw ends and an adjusting turn-buckle.

There is upon the weight 17 or other suitable connecting devices to the weighted bottom T a projecting ledge or flange 18, and there is a pendent stop 19 pivoted at its upper end to a stud upon or supported by the frame A, and the length of this pendent stop is such that when the weighted bottom T is closed up this stop 19 hangs above the ledge or flange 18, and the weighted bottom is held in its closed position by the weights only.

Upon the upper end of the vibrator Q there is a finger 20 projecting toward the weight 17; but the position of the axis of the vibrator Q and the finger 20 upon the upper end of the vibrator is such that this finger passes at some little distance above the ledge or flange 18, and as the vibrator moves the pendent stop 19 is pressed by the finger 20 and moved until the end of such pendent stop passes off the ledge 18. The parts are to be timed so that the weighted bottom T descends by the weight of fiber supplied into it until the flange 18 is stopped by the lower end of 19, and in so doing the slotted link O' causes the pawl O to move and its end comes into the path of the vibrating pusher K. Hence the elevating-apron C is stopped and no more fiber goes into the receiver S and the parts remain inactive until the finger 20 pushes the pendent stop 19 from off the ledge or flange 18 and allows the weighted bottom T to swing downwardly and discharge the contents of the receiver S upon the apron or belt N, and when this has taken place the weight 17 restores the bottom T to its normal position and draws up the slotted link O' and moves the pawl O, so that its end is out of the way of the pusher K, and the rocker L swings by the action of the gearing so as to bring the wheel F into contact with the wheel G and start the elevating-apron C, and this continues until the proper weight of fiber has been supplied into the receiver S and the bottom T swings downwardly as before described, until the movement is arrested by the pendent stop 19 and ledge 18 and the movement of the elevated apron is again arrested. In consequence of the vibrator Q and finger 20 moving in both directions over the ledge 18, the contents of the receiver will be discharged twice for each revolution of the wheel W.

The details of construction may be varied, the essential features of my improvement being that the partial descent of the bottom of the hopper or receiver is made use of in stopping the elevating-apron and arresting the further supply of fiber into the receiver, and the receiver is discharged periodically, according to the speed of the feeding-apron and rolls of the carding-machine, and the gearing driving the elevating-apron is again brought into action automatically by the restoration of the weighted bottom of the receiver to its normal position.

I find it advantageous to provide a curved bottom 14 to the receiving-hopper, and the movable side 13 is pivoted at 10 and receives its motion from a rock-shaft 9, actuated by a crank-pin 7 and connecting-rod to a slotted crank-arm 5 on the rock-shaft 9, the cam 4 serving to give motion to the swinging side 13 of the hopper, so that the fiber is pressed toward the elevating-apron C, and there is a downward inclination of the bottom 14, adjacent to the elevating-apron C, so that the mass of fiber that is adjacent to the elevating-apron does not slide back upon the bottom 14, but remains adjacent to the said elevating-apron and the upper part of the mass of fiber falls toward the movable side 13, as such movable side 13 is allowed to swing back, so that the mass of fibrous material in the hopper receives a partial rotary movement to more uniformly mix the same and present it to the ranges of teeth upon the elevating-apron, and it is to be understood that these ranges of teeth upon the elevating-apron are at sufficient distances apart to allow the fiber to pass in between one range of teeth and the next, as described in the aforesaid patent, so that the teeth take their proper proportion of wool as the apron ascends and the bat or mass of wool across each range of teeth is removed at one operation by the doffer, and it is sufficient in quantity to insure the proper movement of the scale when the last mass of wool falls. Hence the stopping of the elevating-apron by the movement of the scale is reliable.

I claim as my invention—

1. The combination, with an elevating-apron for carrying up wool or other fiber, and a receiver for such fiber and the movable bottom to such receiver, of gearing for driving the elevating-apron, the feed-rollers and apron for the carding or similar machine, mechanism, substantially as specified, that is brought into action by the partial descent of the bottom of the receiver for stopping the movement of the elevating-apron, a mechanism receiving its motion from or simultaneously with the feed-rolls for allowing the complete movement by gravity of the bottom of the receiver and the discharge of the fiber, and a connection from the receiver-bottom for restoring the driving mechanism to its operative position and actuating the elevating-apron as the receiver-bottom returns to its elevated position, substantially as set forth.

2. The combination, with the receiver, its bottom T, and the lever and weight, of an elevating-apron and gearing containing a movable gear for driving the same, a rocker carrying the movable gear, a pawl and pusher for moving the rocker and disconnecting the gear, a vibrator and a connection from the same to the feed-rolls, a pendent stop for holding the bottom of the receiver, which pendent stop is acted upon by the vibrator to allow the discharge of the contents of the receiver, substantially as set forth.

3. The combination, with the elevating-apron and its actuating-gearing containing a movable gear, of the rocker carrying one of the gears, a pawl pivoted to the rocker, an eccentric and pusher for acting upon the pawl and rocker, a receiver for the fiber, a weighted bottom to the same, and a connection between the weighted bottom and the pawls, and a vibrator actuated by a connection from the feed-rolls for controlling the movement of the weighted bottom of the receiver, substantially as set forth.

4. The combination, with an elevating-apron, a hopper, and a movable side to the hopper and mechanism for giving motion to the same, of a bottom to the hopper, curved upwardly and having a downward incline adjacent to the elevating-apron for holding the wool as it is pressed toward such elevating-apron, substantially as set forth.

5. The combination, with the elevating-apron and the feed-rollers and apron for a carding-machine, of a receiver and a bottom for the same hinged at the side adjacent to the elevating-apron, so that the wool is discharged from the bottom in the direction of motion of the apron leading to the feed-rollers, and mechanism actuated in unison with the carding-machine for allowing the receiver-bottom to descend at regular intervals by the weight of the wool to deliver the same, substantially as specified.

Signed by me this 21st day of April, 1891.

HENRY TINDELL.

Witnesses:
  T. F. DICKERSON,
  HARRY D. CROWELL.